May 21, 1935. R. H. CHILTON 2,002,232
REFRIGERATOR FREEZING TRAY
Filed Feb. 6, 1933

INVENTOR
Ralph H. Chilton
BY
Spencer Hardman & Fehr
his ATTORNEYS

Patented May 21, 1935

2,002,232

UNITED STATES PATENT OFFICE 2,002,232

REFRIGERATOR FREEZING TRAY

Ralph H. Chilton, Dayton, Ohio, assignor, by mesne assignments, to General Motors Corporation, Detroit, Mich., a corporation of Delaware Application February 6, 1933, Serial No. 655,311

8 Claims. (Cl. 62—108.5)

This invention relates to freezing devices, especially such as are adapted for home use in electric refrigerators.

The general object of the invention is to provide a combination of a freezing chamber and freezing tray therefor wherein the tray will not be bonded by frozen condensation water to its support within the freezing chamber even if it remains therein a long period of time after its contents are completely frozen. In present refrigerators now in use the freezing trays rest upon a refrigerated metal surface and consequently are easily frozen tightly thereupon either by an accumulation of condensation frost thereby an accumulation of condensation frost thereon around or by the freezing of a film of water on the outside of the tray when it is inserted in place in the freezing chamber. If such trays are left unmolested for quite a long period it often happens that they become so tightly frozen in place that it is impossible to remove them until the refrigerator compressor is turned off and the entire cooling unit defrosted. The construction of this invention prevents the ice tray becoming frozen in place even though it may rest directly upon a very cold metal surface in the freezing chamber.

Another object of the invention is to provide a construction wherein a very rapid transfer of heat is obtained between the removable freezing tray and the refrigerated metal surface in the freezing chamber upon which it is supported.

Another object is to provide a flexible non-metallic freezing tray having metal parts associated therewith which serve to quickly transfer the heat from the non-metallic walls of the tray to the refrigerated anti-freeze liquid upon the tray support, whereby rapidity of freezing of the tray contents is greatly enhanced.

A feature of the tray construction is the spacing of the bottom edges of the heat transferring metal strips lying in the hollow non-metallic partitions materially above the bottom wall of the flexible non-metallic tray, whereby said flexible bottom wall may be more readily flexed upwardly with the fingers to facilitate removal of the frozen contents of the tray. Such spacing also permits the cold anti-freezing liquid to flow freely between the non-metallic partitions at the lower part thereof when the tray is inserted in place in the freezing chamber or removed therefrom.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
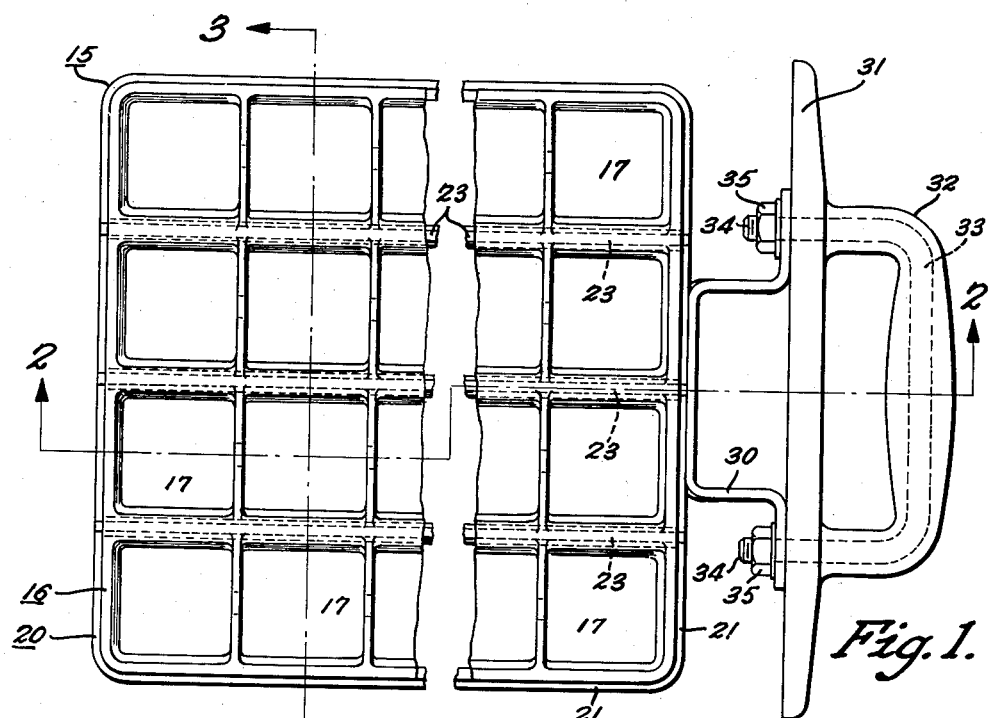
Fig. 1 is a partial plan view of a freezing tray made according to this invention.
Figure 2:
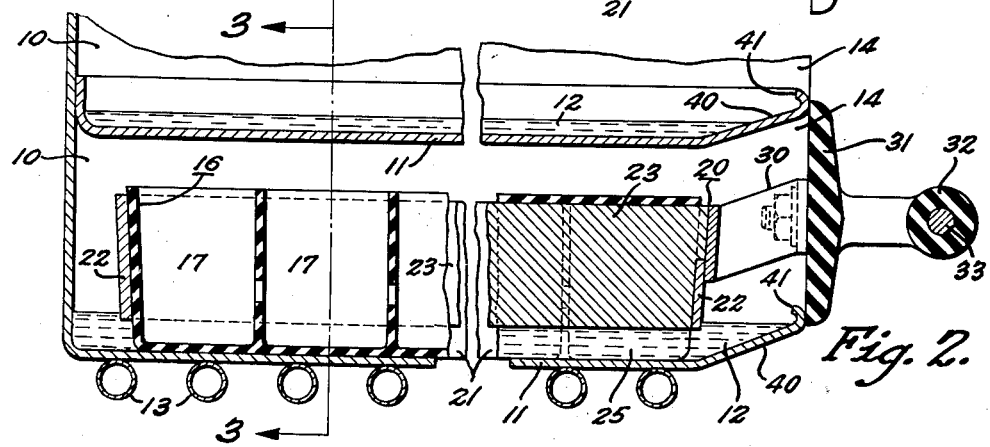
Fig. 2 shows a section through the freezing tray on line 2—2 of Fig. 1, and further shows the combination of the freezing tray with the freezing chamber of this invention.
Figure 3:
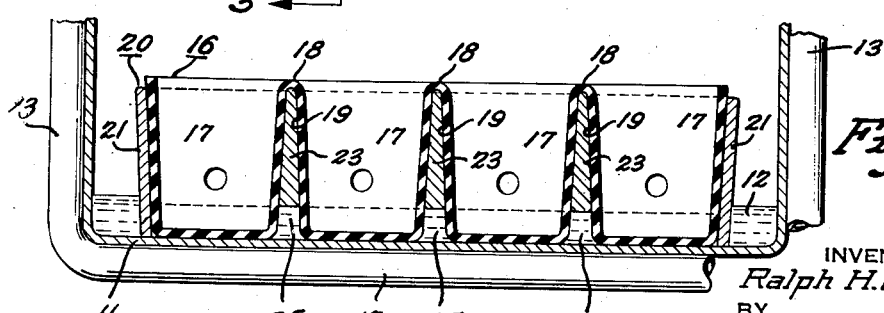
Fig. 3 is a transverse section taken on line 3—3 of Figs. 1 and 2.

The freezing compartment illustrated in Figs. 2 and 3 comprises a series of tray chambers 10 located one above the other, only two chambers 10 being shown in Fig. 2 but obviously other freezing tray chambers 10 may be added above those shown if it is so desired. Each chamber 10 has a liquid retaining bottom wall 11 which is covered with an anti-freezing liquid 12 to the desired depth for any particular design of refrigerant coils 13 preferably lie in intimate heat-transferring contact with the chamber bottom 11 to increase rapidity of heat transfer from the liquid 12. This liquid 12 may be any suitable liquid which will not freeze at the temperatures used in the freezing chambers 10, such as mercury, brine of any suitable concentration, water-glycerine solution, prestone, or various anti-freeze liquids now commonly used in automobile radiators.

The most suitable liquid for any particular case depends upon the nature of the walls of the chamber 10 and the freezing tray 15 with which it contacts. Mercury has the advantages of being an excellent heat conductor and being nonmiscible with the condensed water but should not be used in contact with tin or copper or other metals which it attacks or absorbs. Mercury is suitable for use in contact with iron or steel surfaces. Any water which may condense within chamber 10 will freeze upon the surface of the mercury 12 instead of mixing therewith, and hence can be readily removed whenever desired simply by breaking and removing the ice. A portion of this ice will stick to the outer sides of the tray 15 and be removed therewith each time the tray 15 and its frozen contents are removed from chamber 10. Thus the surface of the mercury will be kept substantially clear of ice and permit the tray 15 to be set down upon the chamber bottom 11 and be immersed in mercury 12.

Brine has the advantages of being very cheap and easily made by the user himself so that it may be simply renewed whenever required. A disadvantage thereof lies in the fact that condensed water may mix therewith and hence it may gradually become more diluted and the liquid level thus raised gradually beyond the desired point. Whenever this occurs, some of the brine may be dipped out and the desired amount of salt added to the remaining liquid 12. Glycerin has the advantages of being non-evaporative and hence will not form odors, and being non-corrosive upon the contacting metal or flexible rubber surfaces of the chamber 10 or tray 15.

Any suitable form of metal or flexible non-metallic ice tray may be used with the chamber 10 containing an anti-freeze liquid upon its bottom and obtain the main advantages set forth above. However, the drawing illustrates a combined rubber and metal freezing tray 15 which is particularly suitable for use within such a chamber 10. This tray 15 comprises a molded flexible rubber container 16 having a series of partitions therein forming separate ice pockets 17. The longitudinal partitions 18 have spaced double walls which form a flat vertically extending open-bottom recess 19 between each pair of rows of ice pockets and running the full length of the container 16. A metal carrier 20 has metal side walls 21 and end walls 22 surrounding and engaging the outer surfaces of the rubber container 16 in good heat-conducting relation therewith. Carrier 20 has fixed thereto the longitudinally extending metal strips 23 lying snugly within the recesses 19 in good heat-conducting relation with the rubber partitions 18, as clearly shown in Fig. 3. Preferably these metal strips 23 and the end walls 22 to which they are fixed terminate at their lower edges above the bottom of the rubber ice pockets 17, thus providing the unobstructed channels 25 of the desired cross section extending longitudinally the full length of the tray. However the lower edges of metal strips 23 and end walls 22 dip into the anti-freeze liquid 12 and are constantly cooled thereby and thus the heat is rapidly conducted away from the rubber partitions 18 and the outer walls of the rubber container 16 by means of this good heat-conducting path. The metal side walls 21 of the carrier 20 preferably extend at least flush with the bottom of the ice pockets 17 and serve as a rigid support for the entire tray 15 upon the chamber bottom 11. The rubber container 16 may be separately molded to the form shown and then pressed down into its snug fit within the metal carrier 20, or if desired, the container 16 may be vulcanized to the metal carrier 20 by using the metal carrier as an insert in the vulcanizing mold. If desired, the metal strips 23 may be flat instead of tapered as shown in Fig. 3, in order to reduce cost.

Any suitable form of handle may be provided for the tray. In the form illustrated, a handle bracket 30 is suitably fixed to the end of the metal carrier 20, such as by welding or brazing. An integrally molded flexible rubber closure front 31 and handle 32 has a U-shaped metal insert 33 therein having projecting threaded ends 34. To assemble the handle to the tray these ends 34 are inserted through holes in the bracket 30 and the nuts 35 applied thereto to secure these parts together. The closure front 31 serves to tightly close the side opening 14 in chamber 10 and prevent the circulation of moisture laden air into chamber 10, whereby to greatly reduce the amount of water condensation within chamber 10.

The bottom wall 11 of chamber 10 is inclined upwardly adjacent opening 14 therein as clearly shown at 40 in Fig. 2, whereby the anti-freeze liquid 12 may be retained thereupon to the desired depth and yet permit the tray to be readily withdrawn from chamber 10 in an obvious manner. Preferably a small up-turned flange 41 is provided at the edge of opening 14 to better prevent any of the liquid 12 from being dragged out when the tray is removed.

In operation, the pockets 17 are filled with water or other substance to be frozen and the tray is inserted through opening 14 by means of the handle 32 until it is in the position shown in Figs. 2 and 3. During the insertion or removal of the tray the liquid 12 flows readily through the longitudinal unobstructed channels 25 along its bottom and thus excessive disturbance of the anti-freeze liquid 12 which might cause it to splash over the flange 41 is prevented. Rapid freezing of the tray contents takes place due to the rapid heat conduction from all the rubber walls to the refrigerated liquid 12, as more fully described above. This anti-freeze liquid 12 immerses all areas of contact between the tray and the chamber bottom 11 and hence the tray cannot be bonded in place by ice or condensed frost, such as nearly always occurs in present day refrigerators. This feature greatly facilitates removal of the tray from the chamber 10 after freezing is completed.

To remove the frozen contents from the tray, the flexible bottom portions of the flexible rubber ice pockets 17 may be easily pushed up with the fingers to eject the ice cubes without the necessity of melting the ice cubes free from their frozen bond to the rubber walls. Since the end walls 22 and the metal strips 23 preferably do not extend all the way to the bottom of the rubber pockets the removal of the ice cubes by this method is greatly facilitated. If it is desired to remove all the ice cubes at one time, the filled tray may be simply pressed down upon a rigid surface, such as the corner of a kitchen table, in such manner that the full depth metal sides 21 will not interfere and thus the bottoms of all the rubber ice pockets 17 may be pushed upwardly at once.

While the form of embodiment of the present invention as herein disclosed, constitutes a preferred form, it is to be understood that other forms might be adopted, all coming within the scope of the claims which follow.

What is claimed is as follows:

1. In a refrigerator, in combination, a series of portable freezing trays, a series of stationary superposed individual refrigerated compartments for said trays, said compartments each having a relatively shallow liquid retaining bottom wall and mercury retained thereupon so as to directly contact the bottom of said tray when it is in its freezing position thereon.

2. In combination, a refrigerated freezing chamber, a removable freezing tray for said chamber, said chamber having a shallow liquid retaining bottom and an anti-freezing liquid retained thereupon and arranged to directly contact the bottom portion of said tray, said tray comprising: a flexible non-metallic container having open bottom hollow partitions therein, and metal strips fitting snugly within said hollow partitions but terminating above the flexible bottom of the container and arranged to have their lower edges contacting said anti-freezing liquid when said tray is in position in said chamber.

3. A freezing tray comprising: a molded flexible non-metallic container having a vertically extending hollow partition therein, a metal strip fitting snugly within said hollow partition in good heat-conducting relationship with the greater portion of the partition walls and extending to an outwardly exposed position near the flexible container bottom but terminating thereabove and arranged to be partially immersed when said tray is set upon a support covered with a refrigerated liquid.

4. A freezing tray comprising: a molded flexible non-metallc container, having a plurality of open botton hollow partitions therein, metal strips located snugly within said hollow partitions in good heat-conducting relation therewith and terminating at a point above the flexible bottom of the container and arranged to directly contact an antifreeze refrigerated liquid retained upon the surface upon which the tray is supported whereby heat is more readily transferred from the partition walls to said liquid.

5. A freezing tray comprising: a flexible non-metallic container, a bottomless metal carrier for said container having upstanding outer metal plates in good heat-conducting relationship with the outer surfaces of said non-metallic container, said metal plates having their lower edges terminating substantially flush with the bottom of said non-metallic container and arranged to directly contact a refrigerated support for said freezing tray.

6. A freezing tray comprising: a flexible non-metallic container, a bottomless metal carrier for said container having upstanding outer metal plates in good heat-conducting relationship with the outer surfaces of said non-metallic container, said metal plates having their lower edges terminating substantially flush with the bottom of said non-metallic container and arranged to directly contact a refrigerated support for said freezing tray, said non-metallic container having hollow partitions therein, said metal carrier having upstanding metal partitions fitting snugly within said hollow partitions and joined at their end to said upstanding outer metal plates.

7. In a refrigerator, in combination, a series of portable freezing devices, a series of stationary refrigerated metal supports for said devices, said supports each having a relatively shallow liquid-retaining pocket and liquid mercury retained thereupon so as to directly contact the freezing device supported thereupon when in its freezing position.

8. In a refrigerator, in combination, a series of stationary refrigerated liquid-retaining pockets each having a relatively shallow pool of refrigerated liquid mercury retained therein, a series of portable freezing devices each having a metallic heat-transfer portion dipping into one of said pockets and directly contacting the refrigerated liquid mercury therein when said freezing devices are located in their freezing positions.

RALPH H. CHILTON.